United States Patent Office 2,894,920
Patented July 14, 1959

2,894,920

RESINOUS COMPOSITION COMPRISING EPOXY RESIN, CURING AGENT AND MIXTURE OF DEXTRINES, MALTOSE AND DEXTROSE AND PROCESS FOR PREPARING

Thomas Ramos, New York, N.Y.

No Drawing. Application February 12, 1957
Serial No. 639,624

9 Claims. (Cl. 260—9)

This invention relates to resinous compositions, to a method of preparing said resinous compositions, and to wall and floor coverings having a basis of said resinous compositions. More particularly, this invention is concerned with improved resinous compositions made from epoxy resins, which compositions, because of their unique properties, are especially useful as coverings for walls and floors.

This application is a continuation-in-part of my application S. No. 409,270, filed February 9, 1954, now abandoned.

It is well known to those familiar with the synthetic resin art that many useful resinous compositions have been prepared by the addition of a curing or hardening agent to a resinous epoxide. The resin products thus formed have been employed to prepare bonding, film-forming and casting compositions useful in the manufacture of electrical devices, laminates, molded products and the like. In their final cured and hardened state the resin product, i.e. the epoxy resin, is crystalline and hard, having a Rockwell hardness of from M80 to M98 and even as high as M110, and a high rate of shear.

It is an important object of this invention to prepare a resinous composition which has a basis of an epoxy resin but which has elastomeric characteristics, i.e. ranging from pliable, flexible compounds to compounds which have the characteristics of natural or synthetic rubber.

Another object of this invention is the preparation of a resinous composition having a basis of an epoxy resin, which has a long pot life, even when worked in large bulk, and may be readily applied to a surface by trowelling, spraying or brush coating.

Still another object of this invention is the preparation of a resinous composition having a basis of an epoxy resin, which may be cast in a mold or otherwise formed into a self-supporting article having elastomeric characteristics.

A further object of this invention is the preparation of a resinous composition having a basis of an epoxy resin, which may be readily trowelled, sprayed or brush coated onto metal and non-metal surfaces to form protective coverings, e.g. walls or floors, which are firmly bonded to said surfaces, and which are rubber-like in their mechanical properties and which are quite resistant to the action of water, heat, alkalies and acids, and to color-fading.

Other objects and advantages of this invention will appear from the following description and claims.

In its broadest aspect, this invention contemplates the addition to a mixture of resinous epoxide and a curing or hardening agent an additive comprising a mixture of saccharides, i.e. mono-, di- and polysaccharides. The resultant mixture is agitated at room temperature in any suitable mixing or blending machine employing mechanical stirrers to produce a non-aqueous resinous composition which may be trowelled, sprayed or brush coated onto a metal or non-metal surface, such as a deck of a ship, a floor of a pantry, galley, dairy, butcher shop, factory, warehouse, or other area subjected to wear or moist conditions, to form a long wearing protective surface thereon, and also onto walls to form waterproof coatings thereon. An important feature of the resinous composition of this invention is that it readily bonds itself to the metal or non-metal surfaces, such as surfaces of ferrous and non-ferrous metals, wood, wood laminates, concrete, latex mastic compositions, cementations compositions, fiber board, plastics, plastic laminates, ceramics, glass and the like without the use of wire mesh, clips or other mechanical fastening devices, or of special bonding agents. The resinous compositions of this invention have a longer and more controllable pot life and work life than the epoxy resin compositions containing a resinous epoxide and curing and hardening agent, but no mixture of saccharides. Because of the longer pot life and work life larger batches may be worked and thus larger areas may be covered with the resinous compositions from a single batch. Moreover, the use of a mixture of saccharides with the resinous epoxide and the curing or hardening agent has the effect of reducing the tendency of the mixture to foam in the mixing apparatus, and lowers the exotherm 100 to 150° F. and more. Furthermore, the use of a mixture of saccharides with the resinous epoxide and curing or hardening agent produces a resinous composition or protective covering which is quite different in mechanical properties from the hard, crystalline epoxy resins formed from resinous epoxides and curing or hardening agents without the saccharides. Thus, the resinous products of this invention exhibit substantially no pin holes, cracks or crazing, have improved strength and a low rate of shear and have the characteristics of an elastomer with respect to elasticity, flexibility, low shear strength and other physical properties.

More specifically, the elastomeric resinous compounds of this invention are formed from resinous epoxides by adding to a resinous epoxide from about 7 to 15%, by weight of the resinous epoxide, of a curing or hardening agent and from about 6 to 10%, by weight of the resinous epoxide, of a mixture of saccharides, such as dextrins, a mixture of dextrins and maltose, molasses or Karo syrup which is a mixture of dextrins, maltose and dextrose, and mixing the three components together at room temperature to form a non-aqueous resinous composition.

The resinous epoxides employed in accordance with this invention are those obtained by condensing polyhydric compounds, such as dihydric phenols, with polyfunctional halohydrins, such as epichlorohydrin and glycerol epichlorhydrin. These resinous epoxides contain at least one terminal 1, 2-epoxide group per molecule and are characterized by having alternating aliphatic chains and aromatic nuclei united through ether oxygen. Such resinous epoxides are known as "Ethoxyline" resins (Chemical Week, September 8, 1951, vol. 69, page 27) and are chemically available under such trade names as "Epon" resins (Shell Chemical Corporation), "Araldite" resins (Ciba Company, Inc.) and "Bakelite C-8" resins (Union Carbide & Carbon Corporation). Generally, such resinous epoxides contain from one to two 1, 2-epoxide groups per molecule and have epoxide equivalents of from 30 to 4000. An example of the resinous epoxides employed in the present invention in the interest of workability is one having an epoxide equivalent no greater than 1000 and which is prepared by condensation of dihydroxy diphenyl dimethyl methane, especially, 4,4'-dihydroxy diphenyl dimethyl methane, with epichlorhydrin. However, good results are obtained by the use of any of the resinous epoxides, As curing or hardening agents for the resinous epoxides any of the well known substances for this purpose may be employed, such as, for example, alkalis like sodium or potassium hydroxide, alkali phenoxides, carboxylic acids or anhydrides thereof like formic acid, oxalic acid or phthalic anhydride, Friedel-Crafts metal halides like aluminum chloride, zinc chloride, ferric chloride or boron trifluoride as well as complexes thereof with ethers, acid anhydrides, ketones, diazonium salts, phosphoric acid, and partial esters thereof, and amino compounds such as triethylamine, ethylene diamine, diethylamine, diethylene triamine, triethylene tetramine, pyridine, piperidine, N,N-diethyl-1,3-propanediamine, dicyandiamide, melamine and fatty acid salts of amines. However, optimum results have ben obtained by the use of the amine curing or hardening agents and it is preferred to employ said amines in the preparation of the resinous compositions of this invention.

In preparing the resinous compositions of this invention, particularly for the purpose of making coverings for surfaces which will receive excessive wear, other constituents may be added, as, for example, Portland cement, sand blasting grit, magnesite (calcined magnesium carbonate), silica sand, marble chips, non-ferrous metal filings and the like. Furthermore, many compounds may be added to the resinous composition as extenders where reduction in cost is desirable and for the purpose of facilitating the workability of the resinous composition. It is emphasized that these compounds do not impart elastomeric properties to the composition, i.e. their incorporation, will not result in a composition having the characteristics of an elastomer, unless the mixture of saccharides is present. Such compounds, which will hereinafter be designated as plasticizers, may be liquid petrolatums; mineral oil or white oils; vegetable oils such as olive, corn, peanut and cotton seed oils; neatsfoot oil; and glycols such as ethylene glycol, diethylene glycol, propylene glycol, triethylene glycol, trimethylene glycol and dipropylene glycol. They may also include the phthalic anhydride esters such as dibutyl phthalate, diethyl phthalate, dicapryl phthalate, dimethyl phthalate, dioctyl phthalate, butyl benzyl phthalate, diisooctyl phthalate, and didecyl phthalate; phosphoric acid esters, such as tricresyl phosphate, triphenyl phosphate, cresyl phosphate and alkyl-aryl phosphates; sebacic acid esters such as dioctyl sebacatate, dibutyl sebacatate, diamyl sebacate, dicapryl sebacate, dimethyl sebacate, diiosoctyl sebacate and sebacic acid esters of the cellosolves; adipic acid esters such as dioctyl adipate, diisooctyl adipate, di-2-ethylhexyl adipate and the adipic acid esters of the cellosolves and polyhydric alcohols; oleic acid esters such as diethylene glycol mono-oleate, glyceryl mono-oleate including lauric acid esters of methyl and butyl alcohols and of glycols and cellosolves; stearic acid esters such as butyl stearate, diethylene glycol monostearate, ethylene glycol monostearate, glyceryl monostearate and 1,2-propylene monostearate; and dioctyl azelate.

It has been found, surprisingly, that the use of dextrose alone with a resinous epoxide and a hardening agent did not produce an elastomeric product. In fact, it produced a hard crystalline epoxy resin having a Rockwell hardness of M80 to M88. The use of maltose alone with a resinous epoxide and a hardening agent also resulted in a crystalline epoxy resin which was softer than the epoxy resin containing sucrose, i.e. the maltose containing epoxy resin had a hardness of from M10 to M30. The resinous compositions produced from a resinous epoxide, a hardener and a mixture of saccharides all had elastomeric characteristics and were too soft to be measured by a Rockwell hardness tester. Accordingly, a Shore Type A Durometer was employed to test the elastomeric compounds and the readings obtained on said testing device ranged from about 40 to about 90. Moreover, when working with resinous epoxides in appreciable quantities and hardening agents, in the absence of saccharide mixtures, undesirable results are obtained. Thus, when working with a batch of 400 grams of a resinous epoxide, prepared by reacting 4,4'-dihydroxy diphenyl dimethyl methane with epichlorhydrin, and 10% by weight of hardener the maximum exotherm is 397° F., the pot life of the epoxy resin produced is from 15 to 17 minutes, and is discolored. Increasing the batch to twice the size with respect to said resinous epoxide and hardening agent results in foaming and smoking and the product is quite charred, unless refrigeration is resorted to. Thus, with large batches of epoxy resins, without the use of the saccharide mixture of this invention, the exotherm is very high, the pot life is of extremely short duration, and hardening takes place almost instantaneously when the hardening agent is added to the resinous epoxide. It will be appreciated, therefore, that the use of epoxy resins in the preparation of floors and other surface coverings where large batches are required is not feasible where the epoxy resins are not modified by the mixture of saccharides such as employed in accordance with this invention.

The following examples in which parts are by weight are given to further illustrate this invention:

Example I 30 ounces of an epoxy resin prepared by condensing 4,4'-dihydroxy diphenyl dimethyl methane with epichlorhydrin is mixed with 2.3 ounces of molasses and 1.8 ounces of triethylene tetramine in a vessel at room temperature until a substantially homogeneous liquid is obtained. The peak exothermic temperature during the mixing was 234° F.

The mixture set to an elastomeric solid mass having the following properties: (1) flexible, (2) pliable, (3) a Shore type Durometer reading of 83.

Example II 40 ounces of an epoxy resin prepared by condensing 4,4'-dihydroxy diphenyl dimethyl methane with epichlorhydrin is mixed with 5.6 ounces of molasses and 3.2 ounces of triethylene tetramine in a vessel at room temperature until a substantially homogeneous liquid is obtained. The peak exothermic temperature during the mixing was 242° F.

The mixture set to an elastomeric solid mass having the following properties: (1) flexible, (2) pliable, (3) a Shore type Durometer reading of 71.

Example III 40 ounces of an epoxy resin prepared by condensing 4,4'-dihydroxy diphenyl dimethyl methane with epichlorhydrin is mixed with 3.2 ounces of molasses and 2.4 ounces of triethylene tetramine in a vessel at room temperature until a substantially homogeneous liquid is obtained. The peak exothermic temperature during the mixing was 246° F.

The mixture set to an elastomeric solid mass having the following properties: (1) having substantially all of the characteristics of natural or synthetic rubber, (2) a Shore type Durometer reading of 71.

Example IV 40 ounces of an epoxy resin prepared by condensing 4,4'-dihydroxy diphenyl dimethyl methane with epichlorhydrin is mixed with 5.6 ounces of Karo syrup and 4.0 ounces of triethylene tetramine in a vessel at room temperature until a substantially homogeneous liquid is obtained. The peak exothermic temperature during the mixing was 248° F.

The mixture set to an elastomeric solid mass having the following properties: (1) flexible, (2) pliable, (3) a Shore type Durometer reading of 81.

Example V 40 ounces of an epoxy resin prepared by condensing 4,4'-dihydroxy diphenyl dimethyl methane with epichlorhydrin is mixed with 5.6 ounces of Karo syrup and 3.0 ounces of triethylene tetramine in a vessel at room temperature until a substantially homogeneous liquid is obtained. The peak exothermic temperature during the mixing was 242° F.

The mixture set to an elastomeric solid mass having the following properties: (1) flexible, (2) pliable, (3) a Shore type Durometer reading of 65.

*Example VI*

40 ounces of an epoxy resin prepared by condensing 4,4'-dihydroxy diphenyl dimethyl methane with epichlorhydrin is mixed with 3.2 ounces of dextrins and 3.2 ounces of triethylene tetramine in a vessel at room temperature until a substantially homogeneous liquid is obtained. The peak exothermic temperature during the mixing was 242° F.

The mixture set to an elastomeric solid mass having the following properties: (1) having substantially all of the characteristics of natural or synthetic rubber, (2) a Shore type Durometer reading of 43.

*Example VII*

40 ounces of an epoxy resin prepared by condensing 4,4'-dihydroxy diphenyl dimethyl methane with epichlorhydrin is mixed with 3.7 ounces of a mixture of equal parts of dextrins and maltose and 3.2 ounces of triethylene tetramine in a vessel at room temperature until a substantially homogeneous liquid is obtained. The peak exothermic temperature during the mixing was 245° F.

The mixture set to an elastomeric solid mass having the following properties: (1) having substantially all of the characteristics of natural or synthetic rubber, (2) a Shore type Durometer reading of 47.

The mixtures in all of the examples given above set on harden in from 4 to 18 hours depending upon the temperature and humidity of the ambient atmosphere; the higher the temperature and the lower the humidity, the faster the rate of hardening, and the lower the temperature and the higher the humidity, the slower the rate of hardening. Thus, all of the foregoing resinous compounds are eminently suitable for use in the laying of floors or in the building of wall surfaces. In connection with the preparation of floor or wall coverings, the fillers and plasticizers are added in quantities sufficient to give the results desired. Preferably, the solid fillers are added in amounts of from three to five times the weight of the resinous material depending on the resiliency desired and/or use to which the covering is to be subjected. The plasticizer is added in amounts of about 10% based on the weight of the resinous compounds.

It is to be understood that the foregoing detailed description is given merely by way of illustration and that many variations may be made therein without departing from the spirit of my invention.

Having described my invention what I desire to secure by Letters Patent is:

1. Process for the production of synthetic compositions having the properties of an elastomer, which comprises mixing together a resinous epoxide prepared by reacting dihydroxy diphenyl dimethyl methane with epichlorhydrin, a curing agent and a mixture of dextrins, maltose and dextrose at atmospheric temperature.

2. Process for the production of synthetic resin compositions having the properties of an elastomer, which comprises mixing together a resinous epoxide prepared by reacting 4,4'-dihydroxy diphenyl dimethyl methane with epichlorhydrin, triethylene tetramine as curing agent and a mixture of dextrins, maltose and dextrose at atmospheric temperature.

3. Process for the production of synthetic resin compositions having the properties of an elastomer, which comprises mixing together a resinous epoxide prepared by reacting dihydroxy diphenyl dimethyl methane with epichlorhydrin, from 7 to 15% by weight of the resinous epoxide of a curing agent, and from 6 to 10% by weight of the resinous epoxide of a mixture of dextrins, maltose and dextrose at atmospheric temperature.

4. A non-aqueous resinous composition comprising a resinous epoxide prepared by reacting dihydroxy diphenyl dimethyl methane with epichlorhydrin, a curing agent and a mixture of dextrins, maltose and dextrose.

5. A non-aqueous resinous composition comprising a resinous epoxide prepared by reacting 4,4'-dihydroxy diphenyl dimethyl methane with epichlorhydrin, triethylene tetramine as curing agent and a mixture of dextrins, maltose and dextrose.

6. A non-aqueous resinous composition comprising a resinous epoxide prepared by reacting dihydroxy diphenyl dimethyl methane with epichlorhydrin, from 7 to 15% by weight of the resinous epoxide of a curing agent, and from 6 to 10% by weight of the resinous epoxide of a mixture of dextrins, maltose and dextrose.

7. A protective covering to be applied to a surface comprising a resinous epoxide prepared by reacting dihydroxy diphenyl dimethyl methane with epichlorhydrin, a curing agent, a mixture of dextrins, maltose and dextrose, and a particulate filler.

8. A protective covering to be applied to a surface comprising a resinous epoxide prepared by reacting 4,4'-dihydroxy diphenyl dimethyl methane with epichlorhydrin, triethylene tetramine as curing agent, a mixture of dextrins, maltose and dextrose, and a particulate filler.

9. A protective covering to be applied to a surface comprising a resinous epoxide prepared by reacting dihydroxy diphenyl dimethyl methane with epichlorhydrin, from 7 to 15% by weight of the resinous epoxide of a curing agent, and from 6 to 10% by weight of the resinous epoxide of a mixture of dextrins, maltose and dextrose, and a particulate filler.

References Cited in the file of this patent

UNITED STATES PATENTS

| | | |
|---|---|---|
| 2,512,996 | Bixler | June 27, 1950 |
| 2,682,515 | Naps | June 29, 1954 |
| 2,811,495 | Witcoff | Oct. 29, 1957 |